United States Patent [19]

Diachina

[11] Patent Number: 5,610,917
[45] Date of Patent: Mar. 11, 1997

[54] LAYER 2 PROTOCOL FOR THE RANDOM ACCESS CHANNEL AND THE ACCESS RESPONSE CHANNEL

[75] Inventor: John Diachina, Research Triangle Park, N.C.

[73] Assignee: Ericsson Inc., Research Triangle Park, N.C.

[21] Appl. No.: 477,574

[22] Filed: Jun. 7, 1995

Related U.S. Application Data

[63] Continuation of Ser. No. 47,452, Apr. 19, 1993.

[51] Int. Cl.⁶ ........................................................ H04J 3/00
[52] U.S. Cl. ................................................. 370/469; 370/336
[58] Field of Search .............................. 370/60.61, 79.8, 370/85.2, 85.3, 94.1, 95.1, 95.3, 118; 379/63; 455/33.1; 340/825.44

[56] References Cited

U.S. PATENT DOCUMENTS

| | | | |
|---|---|---|---|
| 4,577,316 | 3/1986 | Schiff | 370/95.3 |
| 4,578,815 | 3/1986 | Persinotti | 455/15 |
| 4,612,637 | 9/1986 | Davis et al. | 370/95.3 |
| 4,783,780 | 11/1988 | Alexis | 379/59 X |
| 4,833,702 | 5/1989 | Shitara et al. | 379/60 |
| 4,905,234 | 2/1990 | Childress et al. | 370/94.1 |
| 5,010,547 | 4/1991 | Johnson et al. | 370/94.1 |
| 5,012,469 | 4/1991 | Sardana | 370/95.1 X |
| 5,050,166 | 9/1991 | Cantoni et al. | 370/95.1 X |
| 5,166,929 | 11/1992 | Lo | 370/85.3 |
| 5,212,684 | 5/1993 | MacNamee et al. | 370/79 X |
| 5,220,562 | 6/1993 | Takada et al. | 370/94.1 X |
| 5,235,592 | 8/1993 | Cheng et al. | 370/94.1 X |

FOREIGN PATENT DOCUMENTS

| | | |
|---|---|---|
| 2060428 | 1/1992 | Canada . |
| 0336079 | 10/1989 | European Pat. Off. . |
| 0370826 | 5/1990 | European Pat. Off. . |

*Primary Examiner*—Melvin Marcelo
*Attorney, Agent, or Firm*—Burns, Doane, Swecker & Mathis, L.L.P.

[57] ABSTRACT

A method for transmitting messages between mobile stations and a cellular switching system is disclosed which improves channel burst capacity by allowing information from two distinct layer 3 messages to be transmitted in a unique layer 2 frame carried within a channel burst. The end of a first layer 3 message and the beginning of a second layer 3 message is identified in an end of message field which is used to delimit the layer 3 message information contained in a subsequent data field.

22 Claims, 3 Drawing Sheets

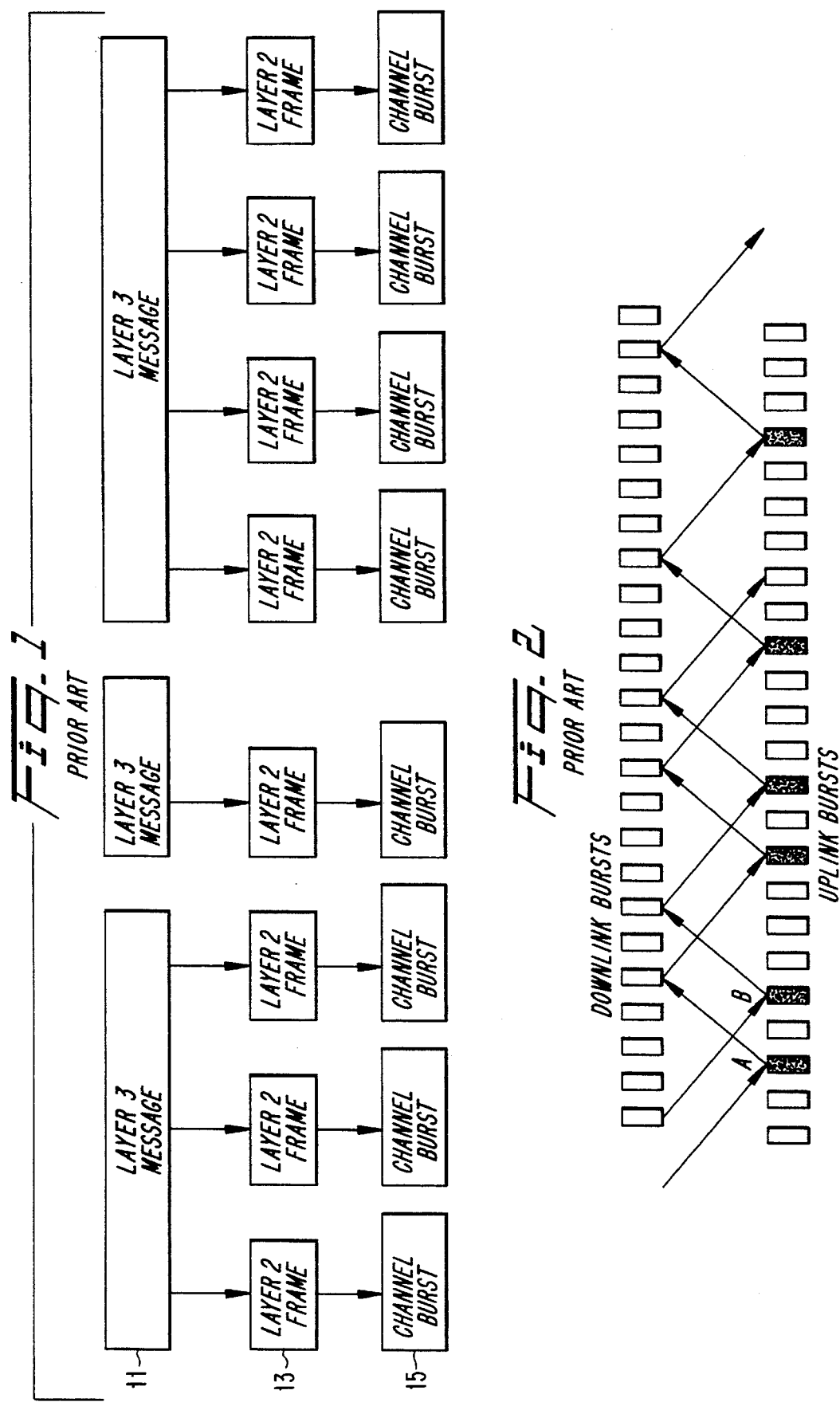

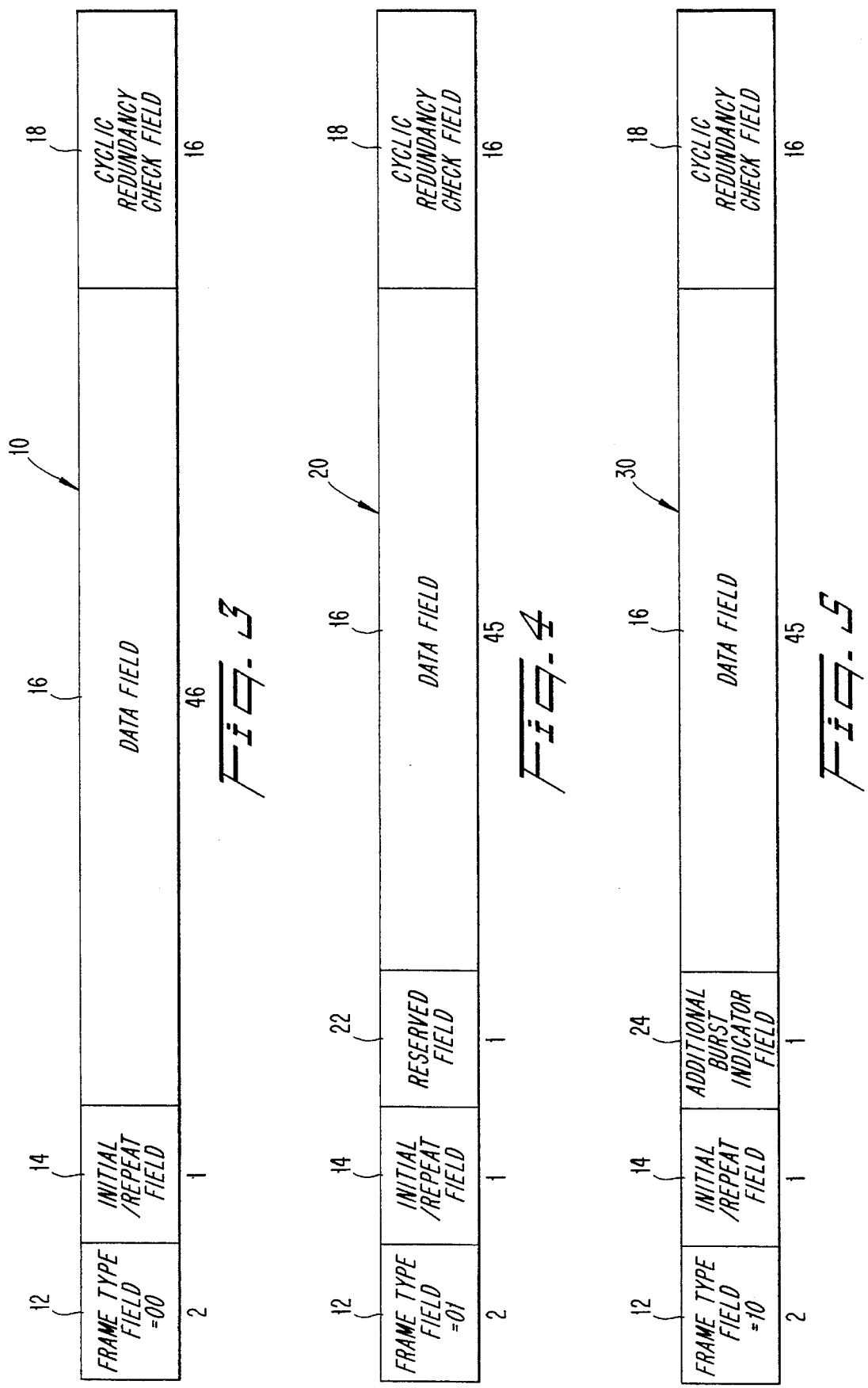

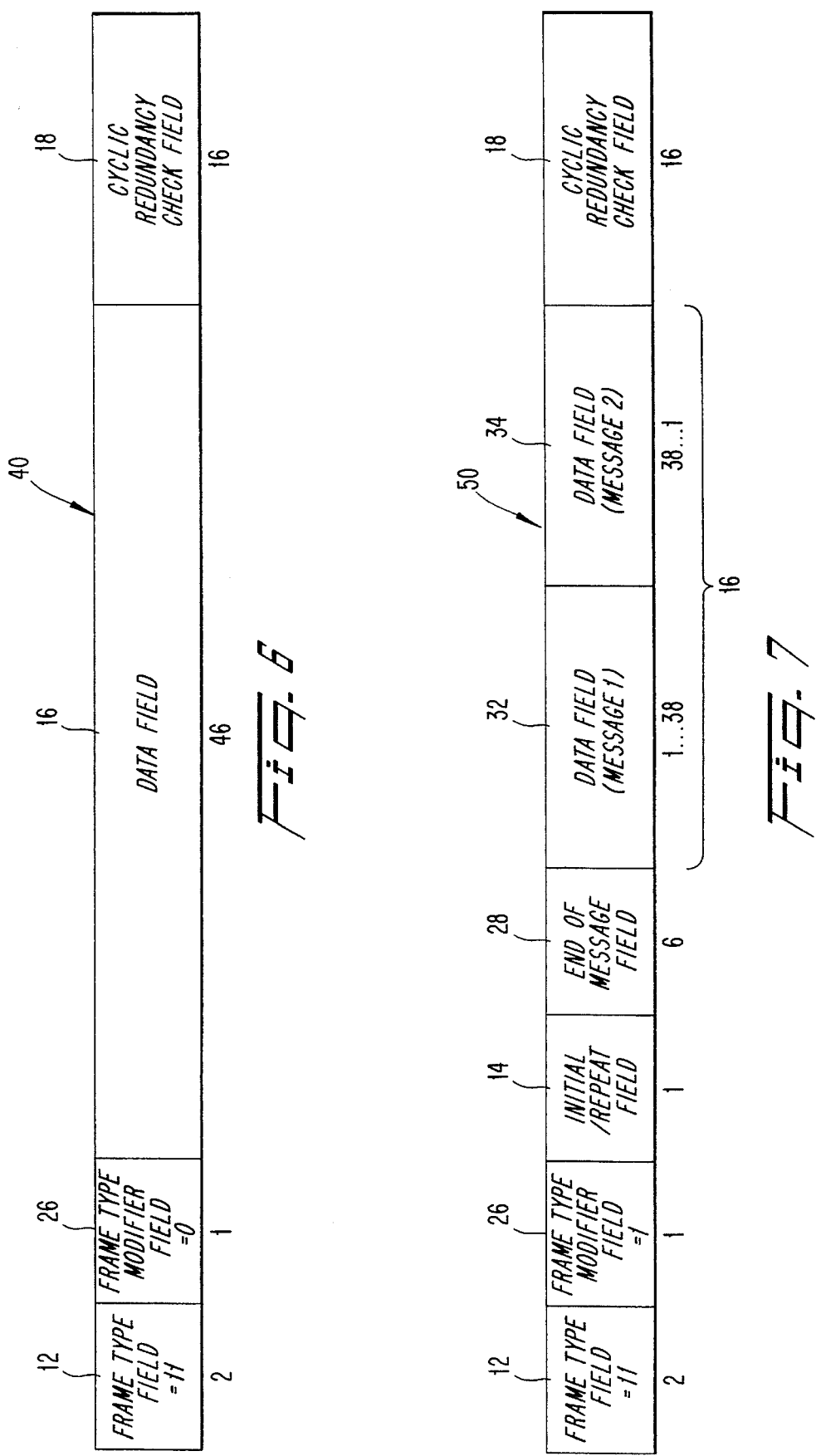

LAYER 2 PROTOCOL FOR THE RANDOM ACCESS CHANNEL AND THE ACCESS RESPONSE CHANNEL

This application is a continuation, of application Ser. No. 08/047,452, filed Apr. 19, 1993 abandoned.

FIELD OF THE INVENTION

The present invention relates to a method for transmitting messages between mobile stations and a central switching system, and more particularly to a method for transmitting these messages using a more efficient communications link protocol over the air interface of a cellular telephone system.

BACKGROUND OF THE INVENTION

In typical land line systems, remote stations and control centers are connected by copper or fiber optic circuits which have a data throughput capacity and performance integrity that is generally significantly better than the data throughput capacity and performance integrity provided by the air interface in a cellular telephone system. As a result, the conciseness of overhead required to manage any selected communication link protocol for land line systems is of secondary importance.

In cellular telephone systems, an air interface communications link protocol is required in order to allow a mobile station to communicate with a cellular switching system (CSS). The communications link protocol is used to initiate and to receive cellular telephone calls. The electromagnetic spectrum available for use by cellular telephone systems is limited and is partitioned into units called channels. Individual channels are used as communication links on either a shared basis or on a dedicated basis. When individual channels are used as communication links on a shared basis, multiple mobile stations may either listen to or contend for the same channels. For the contending situation, each shared channel can be used by a plurality of mobile stations which compete to obtain exclusive use of the channel for a limited period of time. On the other hand, when individual channels are used as communication links on a dedicated basis, a single mobile station is assigned the exclusive use of the channel for as long as it needs it.

In light of the generally reduced data throughput capacity and performance integrity afforded by an individual channel in a channel sharing situation in a cellular telephone environment, the selection of an efficient air interface protocol to serve as the basis of the communication link becomes paramount.

The communication link protocol is commonly referred to as a layer 2 protocol within the communications industry and its functionality includes the delimiting or framing of higher layer messages. Traditional layer 2 protocol framing mechanisms of bit stuffing and flag characters are commonly used in land line networks today to frame higher layer messages, which are referred to as layer 3 messages. These layer 3 messages may be sent between communicating layer 3 peer entities residing within mobile stations and cellular switching systems.

Communications between mobile stations and the cellular switching system will in general be described with reference to FIGS. 1 and 2. FIG. 1 illustrates a plurality of layer 3 messages 11, layer 2 frames 13, and channel bursts 15. A channel burst 15 is the shortest or smallest transmission event that occurs between the mobile stations and the CSS. In FIG. 1, the channel bursts are separated in time but they do not need to be separated. In other words, as soon as one channel burst ends the next channel burst could begin. A channel burst 15 contains a complete layer 2 frame as well as other information such as, for example, error correction information. Each layer 2 frame is divided into a plurality of different fields. One of the fields, the data field which has a limited length, contains at least a portion of a layer 3 message 11. Since layer 3 messages have variable lengths depending upon the amount of information contained in the layer 3 message, a plurality of layer 2 frames may be needed for transmission of a single layer 3 message. As a result, a plurality of channel bursts may also be needed to transmit the entire layer 3 message as there is a one to one correspondence between channel bursts and layer 2 frames. When multiple channel bursts are required to send a layer 3 message, the multiple bursts are not usually successive bursts. Since time is required to receive, process, and react to a received burst, the bursts required for transmission of a layer 3 message are sent in a staggered format as is illustrated in FIG. 2. In FIG. 2, a path A illustrates the communications between a mobile station A and the CSS. In this example, the mobile station A uses every sixth uplink (the mobile station to CSS direction) channel burst to transmit a layer 3 message to the CSS. As a result, other mobile stations, for example, mobile station B, can also transmit a layer 3 message to the CSS while the mobile station A is in the process of transmitting a layer 3 message by using a different set of associated uplink bursts.

In Time Division Multiple Access (TDMA) based cellular telephone systems, the inherent channel coding format has been proposed as a means to accomplish the basic layer 2 frame delimiting function and is an effective way of eliminating the previously referenced traditional layer 2 framing mechanisms of bit stuffing and flag characters. The TDMA channels can be used on either a dedicated or a shared basis. These TDMA channels are essentially a sequence of transmission units or bursts wherein each burst has a certain fixed information carrying capacity. As a result, each burst typically carries only a portion of a layer 3 message. When a TDMA channel is used on a shared basis, it can be referred to as a digital control channel in which multiple mobile stations either contend for its use when sending layer 3 messages to the cellular switching system (on the uplink) or collectively listen to the CSS for potential layer 3 messages intended for their reception (on the downlink). In the uplink direction, multiple mobile stations attempt to communicate with the cellular switching system on a contention basis, while multiple mobile stations listen for layer 3 messages sent from the cellular switching system in the downlink direction. However, additional layer 2 throughput performance enhancements are still desirable as both the uplink or random access channel (RACH) and the downlink or access response channel (ARCH) may have multiple distinct layer 3 messages pending at any given point of time.

In known systems, any given layer 3 message must be carried using as many TDMA channel bursts as required to send the entire layer 3 message. The last TDMA channel burst used in sending a distinct layer 3 message may not be used to its fullest capacity since the last portion of the layer 3 message may not occupy the entire data field. In these systems, no provisions have been made for allowing any pending layer 3 message to be started within the remaining capacity of the data field. As a result, the present systems effectively waste available TDMA channel burst capacity whenever an additional separate and distinct layer 3 message is available and ready for transmission at the same time the completion of a previously initiated layer 3 message transmission can be accomplished within any given TDMA channel burst.

SUMMARY OF THE DISCLOSURE

There is accordingly a need for a method for transmitting messages between mobile stations and a cellular switching system which improves the channel burst capacity. Accordingly, it is an object of the present invention to provide a method for transmitting messages between mobile stations and a cellular switching system in which a given channel burst can contain information belonging to separate and distinct layer 3 messages.

Accordingly, it is an aspect of the present invention to provide a method for transmitting messages between mobile stations and a cellular switching system using the concept of a layer 2 protocol frame carried within a channel burst, wherein the frame is first divided into a plurality of fields. The type of frame is then identified in a frame type field. The end of a first layer 3 message and the beginning of a second layer 3 message is identified in an end of message field used to delimit the portions of layer 3 messages contained in a subsequent data field. Finally, the layer 2 frame is transmitted in either an uplink or downlink channel burst.

BRIEF DESCRIPTION OF THE DRAWINGS

The present invention will now be described in more detail with reference to preferred embodiments of the invention, given only by way of example, and illustrated in the accompanying drawings, in which:

FIG. 1 illustrates a plurality of layer 3 messages, layer 2 frames, and channel bursts in a communication system;

FIG. 2 illustrates the communication path between a mobile station and a cellular switching system in the form of channel bursts;

FIG. 3 illustrates a beginning frame in one embodiment of the present invention;

FIG. 4 illustrates an intermediate frame in one embodiment of the present invention;

FIG. 5 illustrates an end frame in one embodiment of the present invention;

FIG. 6 illustrates a dedicated layer 2 frame in one embodiment of the present invention; and FIG. 7 illustrates a shared layer 2 frame in one embodiment of the present invention.

DETAILED DESCRIPTION OF THE DISCLOSURE

While the following description is in the context of Time Division Multiple Access cellular communication systems, it will be understood by those skilled in the art that the present invention may apply to other digital communication applications such as Code Division Multiple Access (CDMA).

In the present embodiment, the layer 2 protocol of the present invention is founded upon establishing four distinct types of layer 2 frames, i.e., a beginning frame, an intermediate frame, an end frame, and an extension frame. These distinct types of layer 2 frames are suitable for transporting layer 3 messages in a cellular telephone system. For the purposes of explanation, the following description assumes a TDMA channel burst structure for fast associated control channels (FACCH) as described in EIA/TIA IS-54B, however the present invention is not limited thereto. The fast associated control channel is a signalling channel for the transmission of control and supervision messages between the cellular switching system and the mobile stations. In this embodiment, the fast associated control channel is structured such that 65 information carrying or payload bits are available in every TDMA channel burst.

In a cellular system, a plurality of mobile stations may be simultaneously ready to communicate with the cellular switching system. However, only one mobile station can communicate with the CSS per uplink channel burst. As a result, the mobile stations which are ready to transmit must compete for available uplink channel bursts (a contention event), wherein only one mobile station will be granted access (winning a contention event) to a sequence of available uplink channel bursts. System throughput performance will degrade in that increased throughput delay will result if a mobile station is forced to transmit on a contention basis, each layer 3 message it may have pending when in the process of attempting to access the CSS. However, the present invention provides a means for avoiding multiple contentions by indicating that separate and yet distinct layer 3 messages from a mobile station are logically associated or concatenated. In the present invention, once a mobile station has won a contention event, i.e., has gained access to the CSS, it can send all the separate and distinct layer 3 messages that are ready for transmission using this concatenation mechanism. This allows the system to have better throughput performance in that contention based CSS accesses are reduced. The present invention also helps increase system throughput by allowing fewer channel bursts to be used in carrying multiple layer 3 messages in that any given channel burst may contain information from two distinct layer 3 messages.

Each layer 2 frame is divided into a plurality of fields including an additional bursts indicator field, a data field, an end of message field, a frame type field, a frame type modifier field, an initial/repeat field, and a reserved field. The various fields will now be described in connection with the figures.

FIG. 3 illustrates a beginning frame in one embodiment of the present invention. The frame 10 is divided into four fields: a frame type field 12; an initial/repeat field 14; a data field 16; and a CRC field 18. Since layer 3 messages may be longer than a single layer 2 frame, multiple layer 2 frames may be needed to transmit a single layer 3 message. As a result, the frame type field 12 identifies the type of frame as being either a beginning frame, intermediate frame, and end frame, or an extension frame. In this embodiment, the frame type field 12 occupies 2-bits of the channel burst payload. The frame type field 12 is the first field of the beginning frame 10 so that the first 2-bits of each channel burst identifies the frame type, wherein 00 indicates a beginning frame, 01 indicates an intermediate frame, 10 indicates an end frame and 11 indicates an extension frame. The beginning frame type is used in the initial burst of a multi-burst layer 3 message transmission.

The beginning frame 10 next has a 1-bit initial/repeat field 14. Transmissions bursts are sometimes incorrectly received. As a result, a transmission burst may need to be retransmitted. However, in order for the CSS to function properly, it must be able to recognize whether the received burst is an initial transmission burst or a repeat transmission burst. As a result, the initial/repeat field 14 indicates whether a channel burst is being transmitted for the first time or is being retransmitted. For example, a 0 in the initial/repeat field 14 indicates that the channel burst is being transmitted for the first time, while a 1 in the initial/repeat field 14 indicates that the channel burst is being retransmitted.

The data field 16 makes up a majority of the beginning frame 10. The data field 16 contains a portion of the layer 3 message which is to be transmitted. Finally, the beginning frame 10 includes a cyclic redundancy check field 18 which is used for error detection. The cellular switching system uses the cyclic redundancy check field 18 to determine whether or not any given uplink channel burst has been received correctly. The method for determining error detection using a cyclic redundancy check (CRC) field is well known in the art and therefore will not be explained.

FIG. 4 illustrates an intermediate frame 20 in one embodiment of the present invention. The intermediate frame is used for intermediate channel bursts of a multi-burst layer 3 message transmission. The intermediate frame 20 includes a frame type field 12, an initial/repeat field 14, a data field 16, and a CRC field 18 which are described above in connection with FIG. 3. A reserved field 22 is added to the intermediate frame to provide for header alignment required to support a clean and consistent transition point for going from intermediate frames to end frames whenever the remaining layer 3 message information is more than 45 bits long. The reserved field is added to the intermediate frame in order to avoid an undesirable transmission situation which would occur if 46 bits of a layer 3 message remain to be transmitted. Without the reserved field, all of the remaining 46 bits of data would be sent in an intermediate frame which would be followed by an end frame which would contain an empty data field. This awkward situation is avoided by adding the reserved field to the intermediate frame so that 45 bits of the remaining 46 bits are transmitted in the intermediate frame and the last bit is sent in an end frame.

FIG. 5 illustrates an end frame 30 in one embodiment of the present invention. The end frame 30 is used for the last burst of a multi-burst layer 3 message transmission. The end frame 30 includes a frame type field 12, an initial/repeat field 14, a data field 16, and a CRC field 18 which are described above in connection with FIG. 3. However, the end frame also includes an additional burst indicator field 24 which provides an explicit indication of message concatenation or linkage, since the additional burst indicator indicates whether or not an additional burst belonging to a separate and distinct layer 3 message sharing the same uplink access event is pending. The additional burst indicator field 24 also provides an explicit indication of message concatenation when used on the downlink channel. If the additional burst indicator field 24 indicates that an additional uplink channel burst is pending, the cellular switching system will continue to operate as if the initial layer 3 message was still being transmitted. This ensures that remaining concatenated layer 3 messages share the same initial uplink access event and are therefore not subject to additional contention.

The fourth type of frame, the extension frame, is illustrated in FIGS. 6 and 7. In FIG. 6, a dedicated layer 2 frame 40 in one embodiment of the present invention is illustrated. The dedicated layer 2 frame 40 is used when a layer 3 message can be transmitted in its entirety within a single channel burst. In other words, the entire layer 3 message can be carried within the 46 bits provided for the data field in this embodiment. The dedicated layer 2 frame 40 contains a frame type field 12, a data field 16 and a CRC field 18 which are described above in connection with FIG. 3. However, the layer 2 frame also includes a frame type modifier field 26, wherein a 0 indicates a dedicated layer 2 frame and a 1 indicates a shared layer 2 frame.

A shared layer 2 frame is illustrated in FIG. 7. The shared layer 2 frame 50 is used whenever a first layer 3 message ends and additional space is available in the data field and an additional separate and distinct layer 3 message is available for transmission. The use of channel burst sharing essentially provides an implicit indication of layer 3 message concatenation or linkage when the shared layer 2 frame is used in the uplink direction. However, when the shared layer 2 frame is used in the downlink direction, the use of channel burst sharing does not provide an implicit indication of layer 3 message concatenation. In other words, in the uplink direction, the two messages 32 and 34 illustrated in FIG. 7 must be from the same mobile station. However, in the downlink direction, the two messages from the cellular switching system can be intended for two different mobile stations. As a result, available channel burst capacity is not wasted when a layer 3 message ends part way through the data field. The shared layer 2 frame 50 contains a frame type field 12, an initial/repeat field 14, a data field 16, and a CRC field 18 which are described above in connection with FIG. 3 and a frame type modifier field 26 which is described above in connection with FIG. 6. As illustrated in FIG. 7, an end of message field 28 is added to the shared layer 2 frame in order to provide layer 3 message delimiting information. In other words, the end of message field 28 indicates where the first layer 3 message 32 ends and the second layer 3 message 34 begins in the data field. As a result, the receiving end (the CSS or a mobile station or stations) can distinguish the two layer 3 messages from each other.

Since there can be many mobile stations competing for the same access opportunities on a channel, there must be a means of distinguishing the mobile stations from each other. In one embodiment of the present invention, the first TDMA channel burst used to carry a layer 3 message, either in part or in whole, sent from a mobile station to the cellular switching system on a contention basis contains information unique to the sending mobile station. The inclusion of such unique information, called partial echo, allows the cellular switching system, after correctly receiving a first channel burst, to provide partial echo feedback to contending mobile stations which clearly indicates which mobile station has had its first channel burst correctly received.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for transmitting messages between mobile stations and a cellular switching system using multiple layer 2 frames, each carried within a channel burst, and providing a message delimiting capability within any specific layer 2 frame, comprising the steps of:

dividing said specific frame into a plurality of fields;

identifying a type of frame in a frame type field;

placing information from two distinct messages in at least one data field;

identifying the end of a first message and the beginning of a second message in an end of message field when said first message does not occupy the entire data field; and transmitting said frame.

2. A method for transmitting messages according to claim 1, wherein said first and second messages are distinct and associated when said frame is transmitted from a mobile station to the cellular switching system.

3. A method for transmitting messages according to claim 2, wherein said first and second messages are from a single mobile station.

4. A method for transmitting messages according to claim 1, wherein said first and second messages can be for different mobile stations when the frame is transmitted from said cellular switching system to mobile stations.

5. A method for transmitting messages according to claim 1, wherein the first layer 2 frame sent in communication with said first message contains information unique to the mobile station.

6. A method for transmitting messages according to claim 1, wherein said frame includes an initial/repeat field for indicating whether or not the frame transmission is being repeated.

7. A method for transmitting messages between mobile stations and a cellular switching system using multiple layer 2 frames, each carried within a channel burst, comprising the steps of:

dividing a layer 3 message into a plurality of layer 2 frames, each layer 2 frame being transmitted in a different channel burst;

dividing each layer 2 frame into a plurality of fields;

identifying each layer 2 frame in a frame type field, wherein layer 3 message concatenation is supported using explicit means; and transmitting the first of a plurality of said layer 2 frames on a contention basis.

8. A method for transmitting messages according to claim 7, wherein said frame has a frame type of one the following: a beginning frame, an intermediate frame, an end frame, or an extension frame.

9. A method for transmitting messages according to claim 7, wherein said frame is a beginning frame when said frame contains only the first portion of said message.

10. A method for transmitting messages according to claim 7, wherein said frame is an intermediate frame when said frame contains an intermediate portion of said message.

11. A method for transmitting messages according to claim 7, wherein said frame is an end frame when said frame contains the last portion of said message.

12. A method for transmitting messages according to claim 7, wherein a dedicated frame contains said entire message.

13. A method for transmitting messages according to claim 7, wherein message concatenation is explicitly indicated by an additional burst indicator field within an end frame.

14. A method for transmitting messages according to claim 8, wherein the layer 3 message portion contained in a beginning frame contains information unique to each remote station associated with said message sent on a contention basis.

15. A method for transmitting messages according to claim 7, wherein said frame includes an initial/repeat field for indicating whether or not the frame transmission is being repeated.

16. A method for transmitting messages between mobile stations and a cellular switching system using multiple layer 2 frames, each carried within a channel burst, and providing a message delimiting capability within any specific layer 2 frame, comprising the steps of:

dividing said specific frame into a plurality of fields;

identifying a type of frame in a frame type field;

placing information from two distinct messages in at least one data field;

identifying the end of a first message and the beginning of a second message using an end of message field when said first message does not occupy the entire data field; and transmitting said frame.

17. A method for transmitting messages according to claim 16, wherein message concatenation is explicitly indicated by an additional burst indicator field within an end frame.

18. A method for transmitting messages according to claim 16, wherein said first and second messages are distinct and associated when said frame is transmitted from a mobile station to the cellular switching system.

19. A method for transmitting messages according to claim 18, wherein said first and second messages are from a single mobile station.

20. A method for transmitting messages according to claim 16, wherein said first and second messages can be for different mobile stations when the frame is transmitted from said cellular switching system to mobile stations.

21. A method for transmitting messages according to claim 16, wherein said first message contains information unique to the mobile station when transmitting said first message on a contention basis.

22. A method for transmitting messages according to claim 16, wherein said frame includes an initial/repeat field for indicating whether or not the frame transmission is being repeated.

* * * * *